(12) United States Patent
Tothfalusi

(10) Patent No.: US 11,850,900 B2
(45) Date of Patent: Dec. 26, 2023

(54) TRAILER COUPLER SHIELDING AND LOCKING DEVICE

(71) Applicant: Alexander Tothfalusi, Mt Brydges (CA)

(72) Inventor: Alexander Tothfalusi, Mt Brydges (CA)

( * ) Notice: Subject to any disclaimer, the term of this patent is extended or adjusted under 35 U.S.C. 154(b) by 0 days.

(21) Appl. No.: 17/742,573

(22) Filed: May 12, 2022

(65) Prior Publication Data

US 2023/0364955 A1    Nov. 16, 2023

(51) Int. Cl.
*B60D 1/60*    (2006.01)
*B60D 1/06*    (2006.01)

(52) U.S. Cl.
CPC . *B60D 1/60* (2013.01); *B60D 1/06* (2013.01)

(58) Field of Classification Search
CPC .................................. B60D 1/60; B60D 1/605
See application file for complete search history.

(56) References Cited

U.S. PATENT DOCUMENTS

| | | | |
|---|---|---|---|
| 4,141,569 A | 2/1979 | Dilk | |
| 4,648,618 A | 3/1987 | Utman | |
| 5,421,601 A * | 6/1995 | Hinze | B60D 1/60 280/507 |
| 5,681,053 A | 10/1997 | Misukanis | |
| D388,383 S | 12/1997 | Foster | |
| 6,244,614 B1 | 6/2001 | Bonvillain | |
| 6,598,432 B1 * | 7/2003 | Dwyer | B60D 1/60 280/507 |
| 7,246,810 B2 | 7/2007 | Bussiere | |
| 7,699,336 B2 | 4/2010 | Van Laere | |
| 9,033,358 B1 * | 5/2015 | Williamson | B60D 1/06 280/507 |
| 10,144,256 B1 * | 12/2018 | Garcia | B60D 1/60 |
| 10,513,159 B2 * | 12/2019 | Odom | B60D 1/60 |
| 11,535,072 B2 * | 12/2022 | Williamson | B60D 1/06 |
| 2022/0041025 A1 * | 2/2022 | Garcia | B60D 1/60 |
| 2022/0402317 A1 * | 12/2022 | Lee, Jr. | B60D 1/60 |

FOREIGN PATENT DOCUMENTS

EP        3530495 B1 *  2/2021  ............... B60D 1/06
WO    WO2010145646       12/2010

* cited by examiner

*Primary Examiner* — Kevin Hurley

(57) ABSTRACT

A trailer coupler shielding and locking device for deterring theft of the trailer and damage to wiring of the trailer includes a clamshell housing, which is positionable around a tongue of the trailer. First and second lock pieces are engaged to the clamshell housing are opposingly positioned relative to its hinge. The second lock piece is complementary to the first lock piece. When the clamshell housing is in a closed configuration, the second lock piece is positioned to engage the first lock piece to lock the clamshell housing in the closed configuration over a hitch ball receiver and a coupler of the trailer to deter theft of the trailer and damage to wiring of the trailer.

7 Claims, 7 Drawing Sheets

TRAILER COUPLER SHIELDING AND LOCKING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to locking devices and more particularly pertains to a new locking device for deterring theft of the trailer and damage to wiring of the trailer. The present invention discloses a locking device comprising a locking device for a trailer comprising a clamshell housing, which is positionable around a tongue of a trailer to cover a hitch ball receiver and a coupler of the trailer. First and second lock pieces are engaged to the clamshell housing to lock the clamshell housing.

(2) Description of Related Art Including Information Disclosed Under 37 CFR 1.97 and 1.98

The prior art relates to locking devices, which may comprise housings having one open side and hinged lids, or one open side, an open top, and hinged lids. Prior art locking devices also comprise devices that clamp to hitch balls, devices that comprise inner pieces with balls over which outer sleeves are positioned, and devices that can be bolted to tongues to cover hitch ball receivers. What is lacking in the prior art is a locking device for a trailer comprising a clamshell housing, which is positionable around a tongue of a trailer to cover a hitch ball receiver and a coupler of the trailer. First and second lock pieces are engaged to the clamshell housing to lock the clamshell housing.

BRIEF SUMMARY OF THE INVENTION

An embodiment of the disclosure meets the needs presented above by generally comprising a clamshell housing, which comprises an upper piece and a lower piece. The upper piece is configured to be positioned on an upper surface of a tongue of a trailer so that the upper piece covers the upper surface and a first section of opposed side surfaces of the tongue. A hinge is attached to and extends between the upper piece and the lower piece. The lower piece is hingable relative to the upper piece to cover a lower surface and a second section of the opposed side surfaces of the tongue. A first lock piece and a second lock piece are engaged to the upper piece and the lower piece, respectively, and are opposingly positioned to the hinge. The second lock piece is complementary to the first lock piece. When the clamshell housing is in a closed configuration, the second lock piece is positioned to engage the first lock piece to lock the clamshell housing in the closed configuration over a hitch ball receiver and a coupler of the trailer to deter theft of the trailer and damage to wiring of the trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
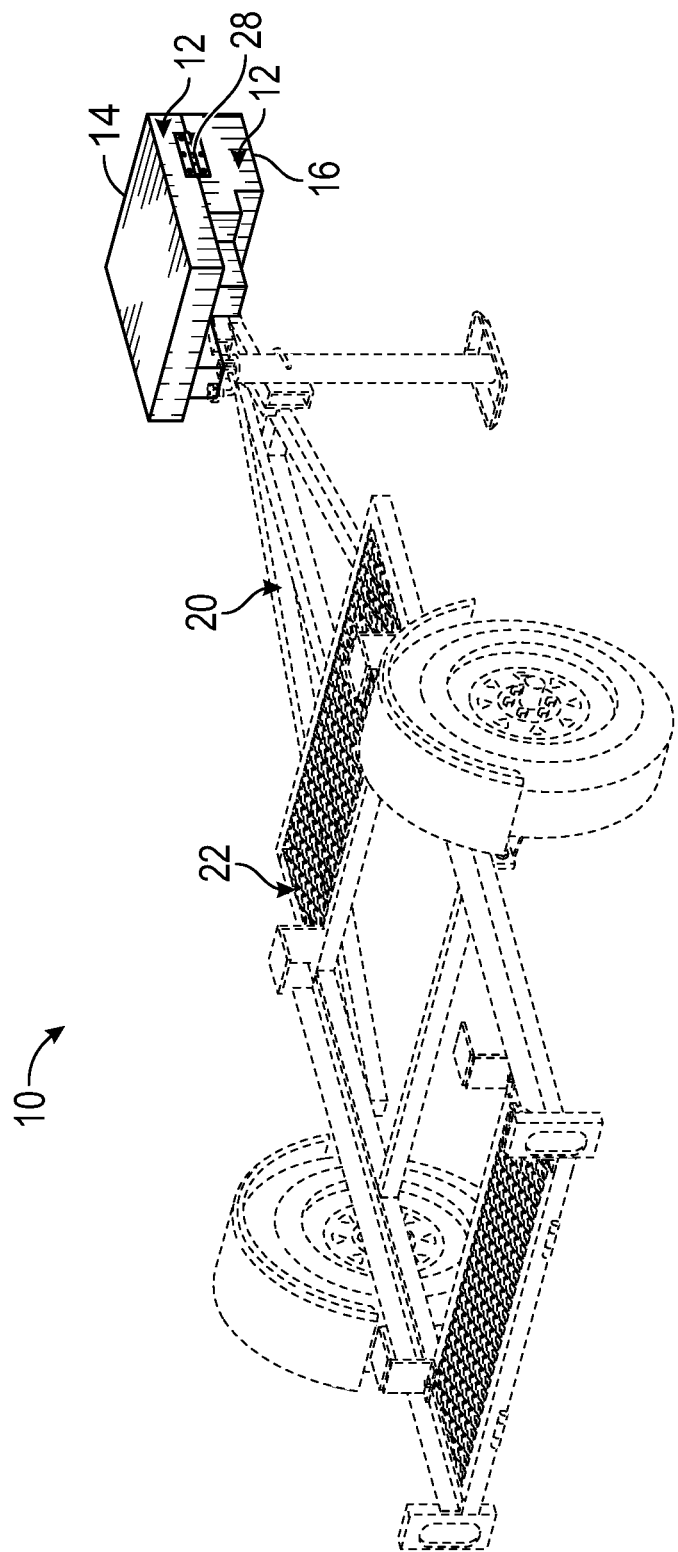
FIG. 1 is an in-use view of a trailer coupler shielding and locking device according to an embodiment of the disclosure.

With reference now to the drawings, and in particular to FIGS. 1 through 7 thereof, a new locking device embodying the principles and concepts of an embodiment of the disclosure and generally designated by the reference numeral 10 will be described.

Figure 2:
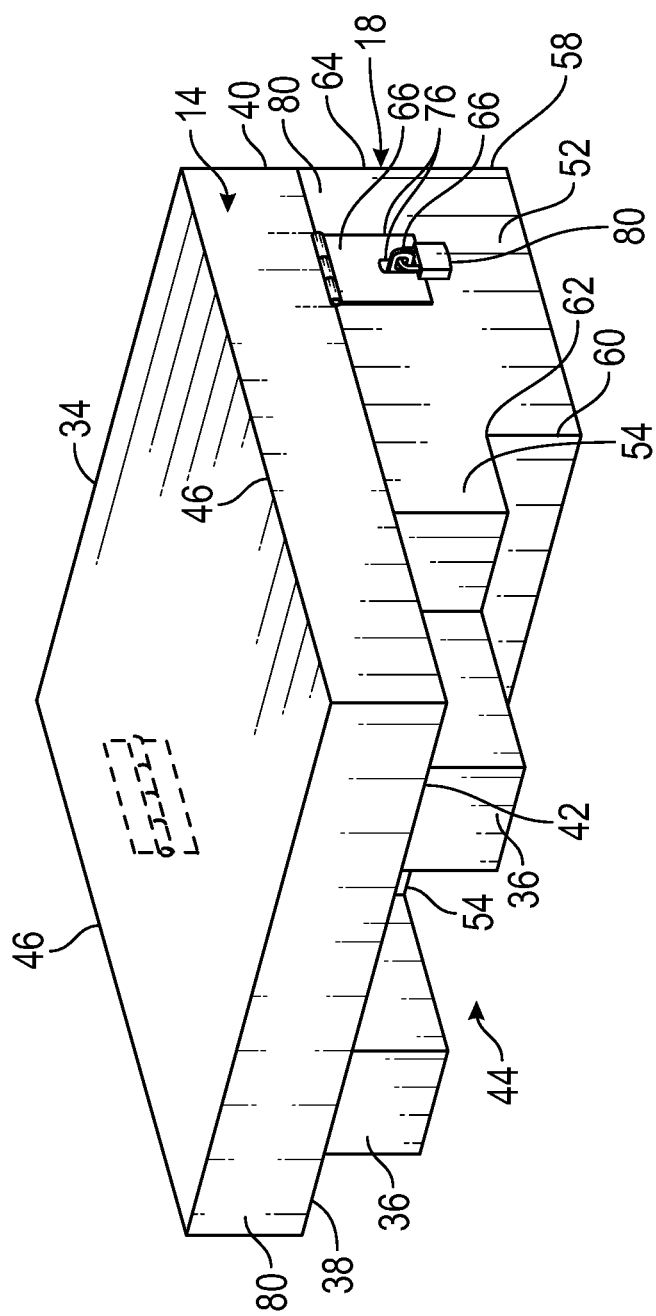
FIG. 2 is an isometric perspective view of an embodiment of the disclosure.

As best illustrated in FIGS. 1 through 7, the trailer coupler shielding and locking device 10 generally comprises a clamshell housing 12, which in turn comprises an upper piece 14 and a lower piece 16. The upper piece 14 is configured to be positioned on an upper surface 18 of a tongue 20 of a trailer 22 so that the upper piece 14 covers the upper surface 18 and a first section 24 of opposed side surfaces 26 of the tongue 20. A hinge 28 is attached to and extends between the upper piece 14 and the lower piece 16. The lower piece 16 is hingable relative to the upper piece 14 to cover a lower surface 30 of the tongue 20 and a second section 32 of the opposed side surfaces 26 of the tongue 20. As shown in FIG. 2, the hinge 28 is exposed. The present invention also anticipates the hinge 28 being hidden and thus largely impervious to tampering.

Figure 5:
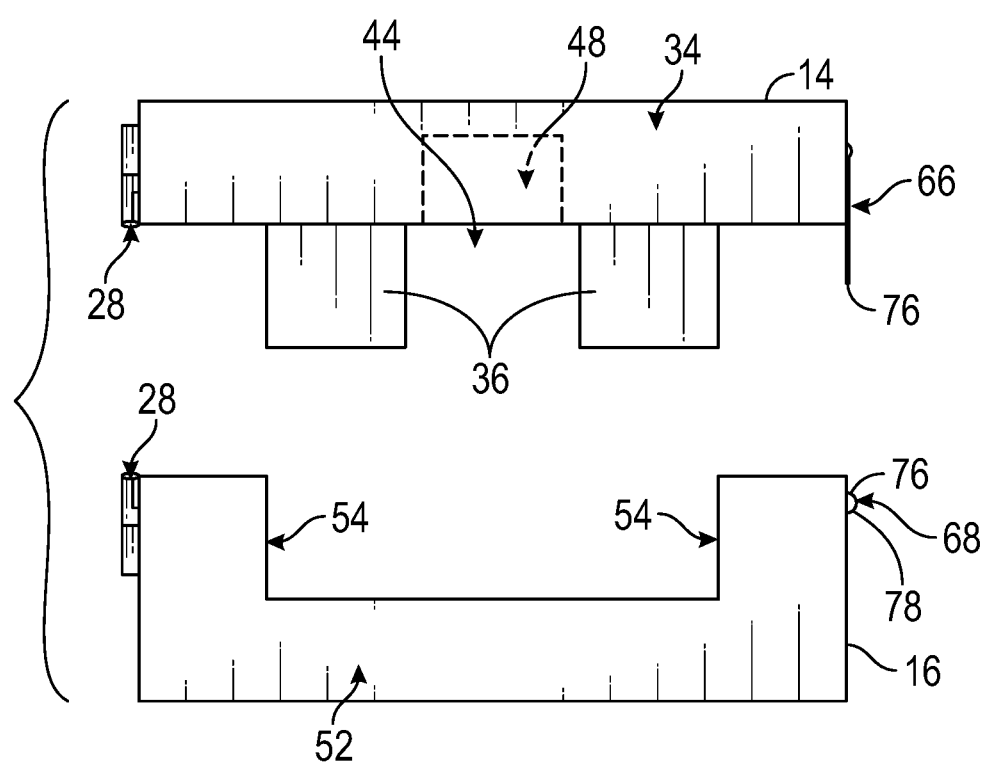
FIG. 5 is a rear view of an embodiment of the disclosure.

As shown in FIG. 5, the upper piece 14 comprises an upper plate 34 and a pair of first bars 36, which is attached to a lower face 38 of the upper piece 14. The first bars 36 extend from a rearward edge 40 toward a forward edge 42 of the upper plate 34 to define a slot 44 into which the tongue 20 of the trailer 22 is insertable. The slot 44 is parallel to and equidistant from opposed sides 46 of the upper plate 34. A recess 48 extends into the lower face 38 of the upper piece 14 and is configured for insertion of a coupler latch 50 as the upper piece 14 is lowered onto the tongue 20.

Figure 6:
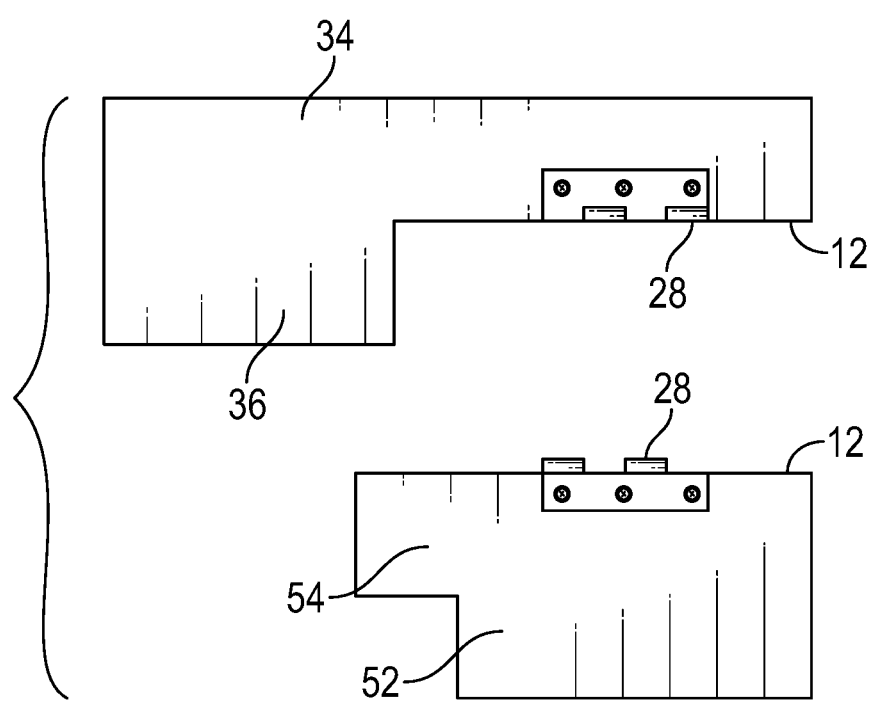
FIG. 6 is a side view of an embodiment of the disclosure.
Figure 7:
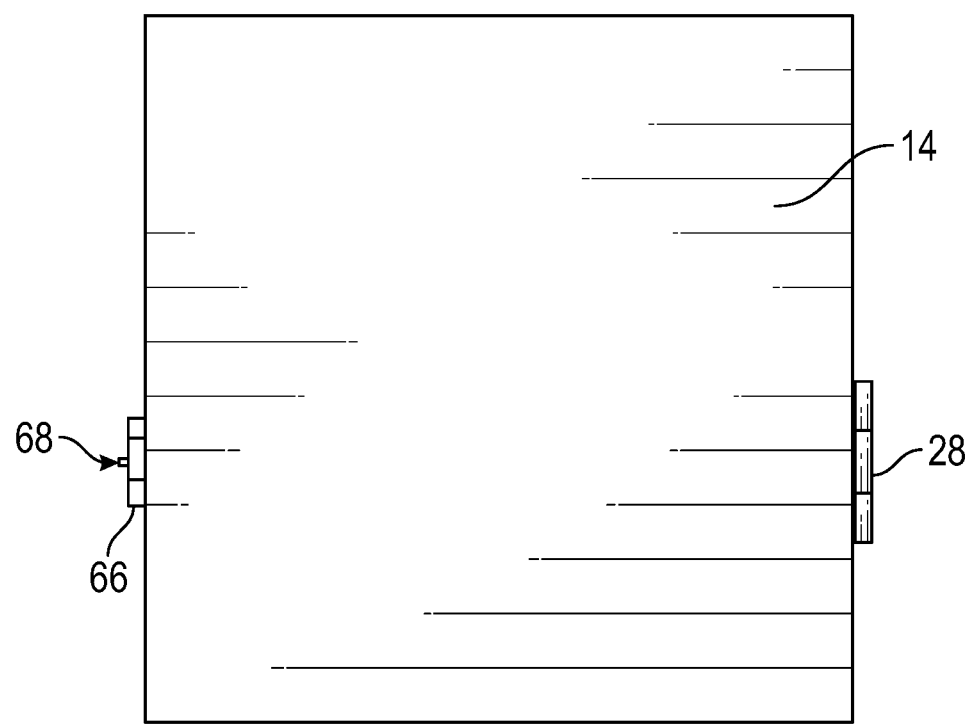
FIG. 7 is a top view of an embodiment of the disclosure.

The lower piece 16 comprises a lower plate 52 and a pair of second bars 54. Opposing sides 56 of the lower plate 52 are separately equally to the opposed sides 46 of the upper plate 34. However, a rear edge 58 and a front edge 60 of the lower plate 52 are separated less than the forward edge 42 and the rearward edge 40 of the upper plate 34, thus the lower plate 52 is shorter than the upper plate 34. Each second bar 54 is positioned adjacent to a forward corner 62 and extends along a respective opposing side 56 of the lower plate 52 and past a rearward corner 64 of the lower plate 52. As shown in FIG. 6, the second bars 54 partially bracket the first bars 36 when the clamshell housing 12 is in the closed configuration.

Figure 3:
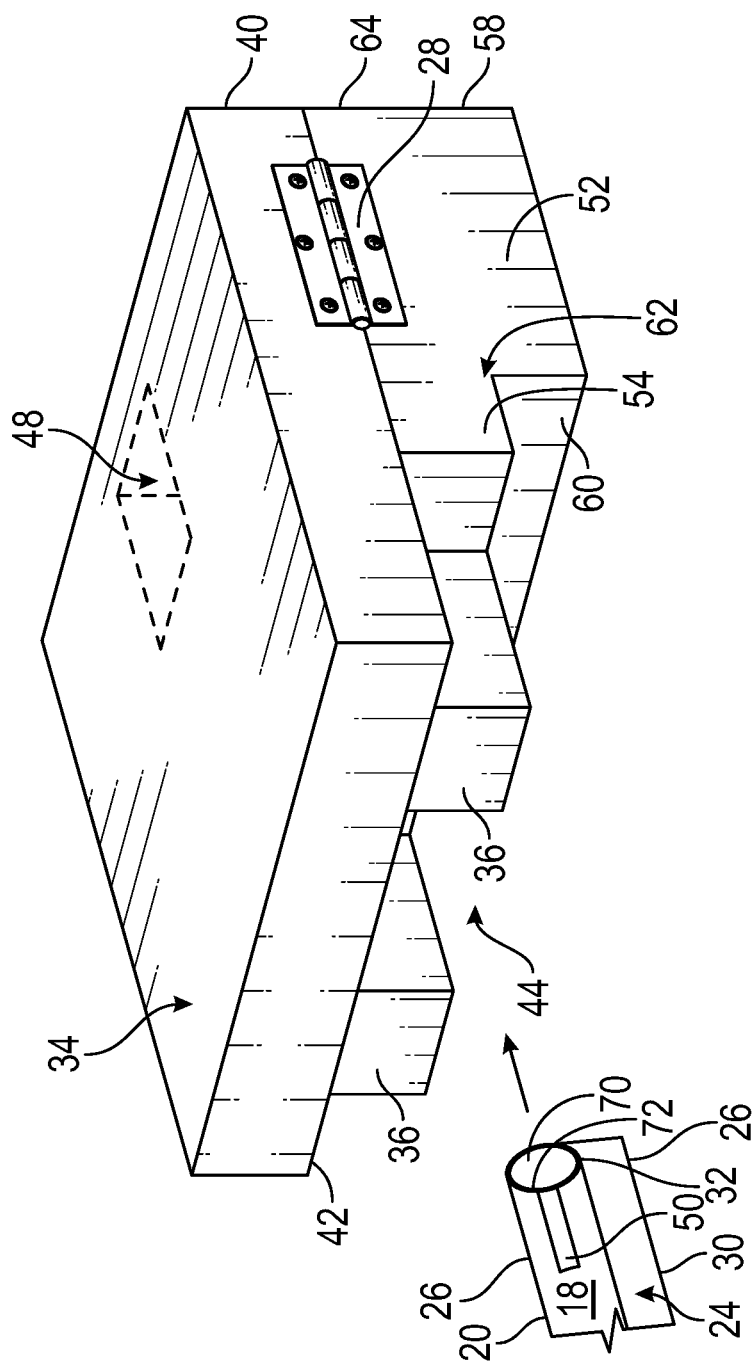
FIG. 3 is an isometric perspective view of an embodiment of the disclosure.
Figure 4:
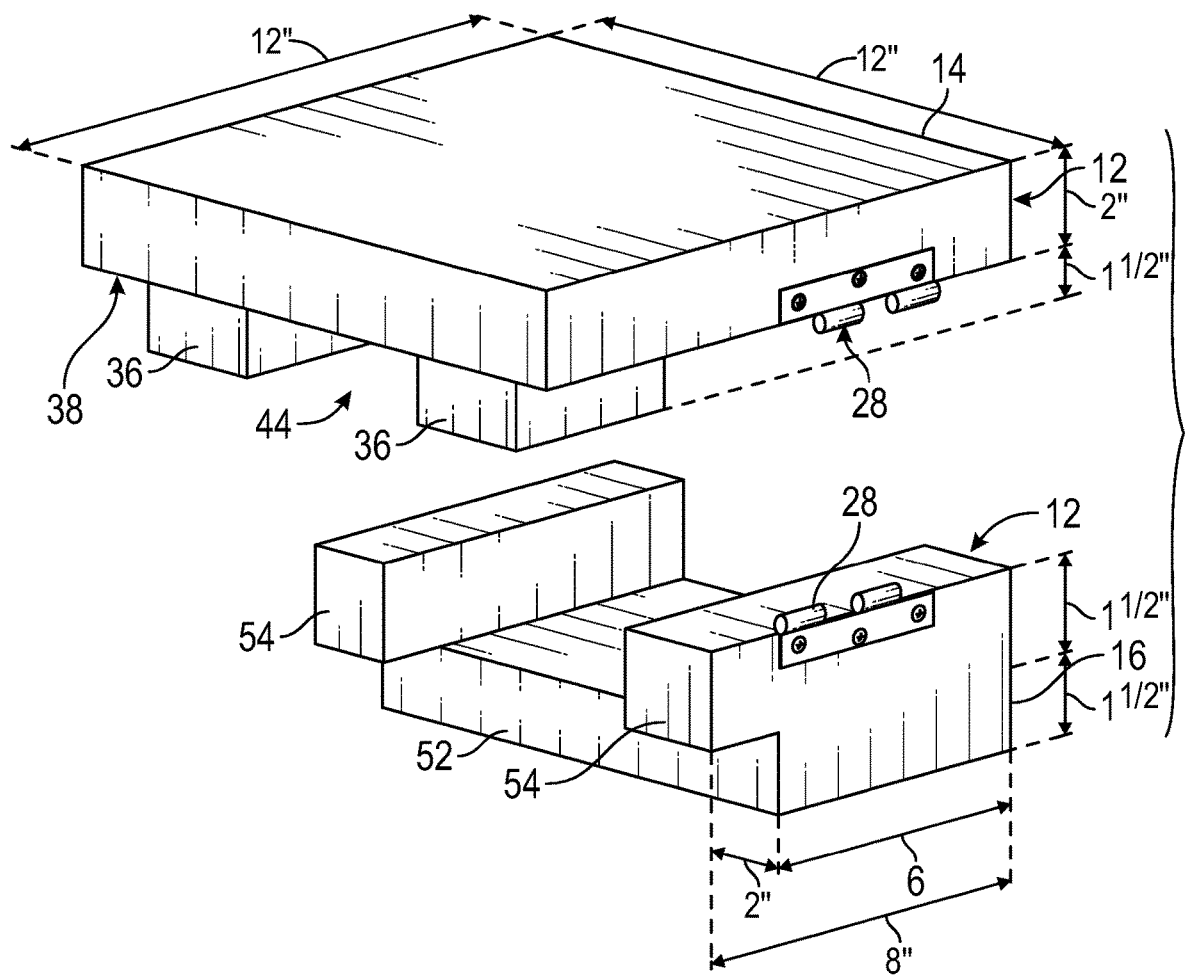
FIG. 4 is an exploded view of an embodiment of the disclosure.

A first lock piece 66 and a second lock piece 68 are engaged to the upper piece 14 and the lower piece 16, respectively, and are opposingly positioned to the hinge 28. The second lock piece 68 is complementary to the first lock piece 66. When the clamshell housing 12 is in a closed configuration, as shown in FIG. 3, the second lock piece 68 is positioned to engage the first lock piece 66 to lock the clamshell housing 12 in the closed configuration over a hitch ball receiver 70 and a coupler 72 of the trailer 22 to deter theft of the trailer 22 and damage, such as may be inflicted by rodents, to wiring 74 of the trailer 22. The first lock piece 66 and the second lock piece 68 may comprise a hasp latch 76, or other locking means, such as, but not limited to, tumbler locks, electronically actuated locks, and the like. A shackle 78 of the hasp latch 76 is configured to selectively engage a padlock 80 to secure the clamshell housing 12 in the closed configuration.

In use, the clamshell housing 12 is positioned around a tongue 20 of the trailer 22, with the upper piece 14 covering the upper surface 18 of the tongue 20 and the coupler latch 50 inserted into the recess 48. The lower piece 16 is then hinged to bring the second lock piece 68 into position to engage the first lock piece 66, whereupon the clamshell housing 12 is locked in the closed configuration over the hitch ball receiver 70 and the coupler 72 of the trailer 22 to deter theft of the trailer 22 and damage to the wiring 74 of the trailer 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trailer coupler shielding and locking device comprising:
   a clamshell housing comprising:
      an upper piece configured for positioning on an upper surface of a tongue of a trailer, such that the upper piece covers the upper surface and a first section of opposed side surfaces of the tongue,
      a lower piece, and
      a hinge attached to and extending between the upper piece and the lower piece, such that the lower piece is hingable relative to the upper piece for covering a lower surface and a second section of the opposed side surfaces of the tongue;
   a first lock piece engaged to the upper piece and being opposingly positioned to the hinge;
   a second lock piece engaged to the lower piece and being opposingly positioned to the hinge, the second lock piece being complementary to the first lock piece, such that, when the clamshell housing is in a closed configuration, the second lock piece is positioned for engaging the first lock piece for locking the clamshell housing in the closed configuration over a hitch ball receiver and a coupler of the trailer for deterring theft of the trailer and damage to wiring of the trailer;
   wherein the upper piece comprises
      an upper plate, and
      a pair of first bars attached to a lower face of the upper piece and extending from a rearward edge toward a forward edge of the upper plate defining a slot into which the tongue of the trailer is insertable, the slot being parallel to and equidistant from opposed sides of the upper plate; and
   wherein the lower piece comprises
      a lower plate, opposing sides of the lower plate being separately equally to the opposed sides of the upper plate, a rear edge and a front edge of the lower plate being separated less than the forward edge and the rearward edge of the upper plate, such that the lower plate is shorter than the upper plate, and
      a pair of second bars, each second bar being positioned adjacent to a forward corner and extending along a respective opposing side of the lower plate past a rearward corner of the lower plate, such that the second bars partially bracket the first bars when the clamshell housing is in the closed configuration.

2. The trailer coupler shielding and locking device of claim 1, further including a recess extending into the lower face of the upper piece, wherein the recess is configured for insertion of a coupler latch as the upper piece is lowered onto the tongue.

3. The trailer coupler shielding and locking device of claim 1, wherein the first lock piece and the second lock piece comprise a hasp latch, wherein a shackle of the hasp latch is configured for selectively engaging a padlock for securing the clamshell housing in the closed configuration.

4. A trailer coupler shielding and locking system comprising:
   a trailer;
   a clamshell housing comprising:
      an upper piece positioned on an upper surface of a tongue of a trailer, such that the upper piece covers the upper surface and a first section of opposed side surfaces of the tongue,
      a lower piece, and
      a hinge attached to and extending between the upper piece and the lower piece, the lower piece being hinged relative to the upper piece to cover a lower surface and a second section of the opposed side surfaces of the tongue;
   a first lock piece engaged to the upper piece and being opposingly positioned to the hinge; and
   a second lock piece engaged to the lower piece and being opposingly positioned to the hinge, the second lock piece being complementary to and engaged to the first lock piece, such that the clamshell housing is locked a closed configuration over a hitch ball receiver and a coupler of the trailer for deterring theft of the trailer and damage to wiring of the trailer;
   wherein the upper piece comprises
      an upper plate, and
      a pair of first bars attached to a lower face of the upper piece and extending from a rearward edge toward a forward edge of the upper plate defining a slot through which the tongue of the trailer is inserted, the slot being parallel to and equidistant from opposed sides of the upper plate; and
   wherein the lower piece comprises
      a lower plate, opposing sides of the lower plate being separately equally to the opposed sides of the upper plate, a rear edge and a front edge of the lower plate being separated less than the forward edge and the rearward edge of the upper plate, such that the lower plate is shorter than the upper plate, and
      a pair of second bars, each second bar being positioned adjacent to a forward corner and extending along a respective opposing side of the lower plate past a rearward corner of the lower plate, such that the second bars partially bracket the first bars when the clamshell housing is in the closed configuration.

5. The trailer coupler shielding and locking system of claim 4, further including a recess extending into the lower face of the upper piece, a coupler latch being inserted into the recess.

6. The trailer coupler shielding and locking system of claim 4, wherein the first lock piece and the second lock piece comprise a hasp latch, wherein a shackle of the hasp latch is configured for selectively engaging a padlock for securing the clamshell housing in the closed configuration.

7. A trailer coupler shielding and locking device comprising:
   a clamshell housing comprising:
      an upper piece configured for positioning on an upper surface of a tongue of a trailer, such that the upper piece covers the upper surface and a first section of opposed side surfaces of the tongue, the upper piece comprising:
         an upper plate, and
         a pair of first bars attached to a lower face of the upper piece and extending from a rearward edge toward a forward edge of the upper plate defining a slot into which the tongue of the trailer is insertable, the slot being parallel to and equidistant from opposed sides of the upper plate,
      a recess extending into the lower face of the upper piece, wherein the recess is configured for insertion of a coupler latch as the upper piece is lowered onto the tongue,
      a lower piece, the lower piece comprising:
         a lower plate, opposing sides of the lower plate being separately equally to the opposed sides of the upper plate, a rear edge and a front edge of the lower plate being separated less than the forward edge and the rearward edge of the upper plate, such that the lower plate is shorter than the upper plate, and
         a pair of second bars, each second bar being positioned adjacent to a forward corner and extending along a respective opposing side of the lower plate past a rearward corner of the lower plate, such that the second bars partially bracket the first bars when the clamshell housing is in the closed configuration, and
      a hinge attached to and extending between the upper piece and the lower piece, such that the lower piece is hingable relative to the upper piece for covering a lower surface and a second section of the opposed side surfaces of the tongue;
   a first lock piece engaged to the upper piece and being opposingly positioned to the hinge; and
   a second lock piece engaged to the lower piece and being opposingly positioned to the hinge, the second lock piece being complementary to the first lock piece, such that, when the clamshell housing is in a closed configuration, the second lock piece is positioned for engaging the first lock piece for locking the clamshell housing in the closed configuration over a hitch ball receiver and a coupler of the trailer for deterring theft of the trailer and damage to wiring of the trailer, the first lock piece and the second lock piece comprising a hasp latch, wherein a shackle of the hasp latch is configured for selectively engaging a padlock for securing the clamshell housing in the closed configuration.

* * * * *